US011994271B2

(12) United States Patent
Tang et al.

(10) Patent No.: US 11,994,271 B2
(45) Date of Patent: May 28, 2024

(54) ILLUMINATION MODULE WITH ANNULAR CIRCUIT BOARD AND MAGNETIC SUPPORTS

(71) Applicants: OPPLE LIGHTING CO., LTD., Shanghai (CN); SUZHOU OPPLE LIGHTING CO., LTD., Suzhou (CN)

(72) Inventors: Caibao Tang, Jiangsu (CN); Jin Zhao, Jiangsu (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 0 days.

(21) Appl. No.: 18/215,150

(22) Filed: Jun. 27, 2023

(65) Prior Publication Data

US 2023/0341114 A1 Oct. 26, 2023

Related U.S. Application Data

(63) Continuation of application No. PCT/CN2021/140427, filed on Dec. 22, 2021.

(51) Int. Cl.
*F21V 21/096* (2006.01)
*F21V 3/02* (2006.01)
(Continued)

(52) U.S. Cl.
CPC .............. *F21V 21/047* (2013.01); *F21V 3/02* (2013.01); *F21V 21/096* (2013.01); *F21V 23/005* (2013.01)

(58) Field of Classification Search
CPC ........ F21V 21/096; F21V 23/05; F21V 5/007; F21V 17/105; F21V 23/003;
(Continued)

(56) References Cited

U.S. PATENT DOCUMENTS 7,997,774 B2 * 8/2011 Liddle ...................... F21V 23/00 362/240
8,651,711 B2 * 2/2014 Rudisill ................ F21V 21/096 362/249.02

(Continued)

FOREIGN PATENT DOCUMENTS

CN 203442626 U 2/2014
CN 105444071 A 3/2016

(Continued)

OTHER PUBLICATIONS

International Search Report of PCT Application No. PCT/CN2021/140427 dated Jan. 26, 2022 with English translation(4).

*Primary Examiner* — Ismael Negron
(74) *Attorney, Agent, or Firm* — Arch & Lake LLP

(57) ABSTRACT

An illumination module includes a light source, which includes an annular circuit board and a plurality of light sources arranged on the annular circuit board. The power supply driver is electrically connected with the annular circuit board. The illumination module further includes an optical component, having opposite front and back surfaces and comprising a power supply accommodating part and a lens part integrally connected to an around area of the power supply accommodating part, a back surface of the power supply accommodating part being provided with a power supply groove, where a front surface of the lens part is provided with a light distribution structure. The illumination module further includes a circuit snap-fit member and a plurality of mounting part snap-fit members extending from a back surface of the lens part.

20 Claims, 5 Drawing Sheets

A-A

(51) Int. Cl.
*F21V 21/04* (2006.01)
*F21V 23/00* (2015.01)

(58) Field of Classification Search
CPC .... F21V 23/004; F21V 23/006; F21V 23/009; F21Y 2105/18
See application file for complete search history.

(56) References Cited

U.S. PATENT DOCUMENTS

| | | | | |
|---|---|---|---|---|
| 9,989,198 | B2 * | 6/2018 | Chen | F21V 29/70 |
| 10,352,512 | B1 * | 7/2019 | Smith | F21V 23/0471 |
| 10,401,002 | B2 * | 9/2019 | Xu | F21V 5/007 |
| 10,859,217 | B2 * | 12/2020 | Liu | F21S 2/005 |
| 10,859,248 | B2 * | 12/2020 | Xu | F21V 5/04 |
| 10,914,452 | B2 * | 2/2021 | Zou | F21V 23/005 |
| 10,989,400 | B2 | 4/2021 | Kohen | |
| 11,215,347 | B2 * | 1/2022 | Xie | F21K 9/00 |
| 11,353,203 | B2 * | 6/2022 | Peng | F21V 7/0066 |
| 11,623,400 | B2 * | 4/2023 | Cambron | B29C 64/264 315/291 |
| 11,686,461 | B1 * | 6/2023 | He | F21V 23/005 362/249.02 |
| 2014/0029252 | A1 * | 1/2014 | Kato | F21K 9/20 362/249.02 |
| 2020/0018469 | A1 | 1/2020 | Kohen | |

FOREIGN PATENT DOCUMENTS

| | | | |
|---|---|---|---|
| CN | 207569716 | U | 7/2018 |
| CN | 207865124 | U | 9/2018 |
| CN | 110741514 | A | 1/2020 |
| JP | 2015008149 | A | 1/2015 |

* cited by examiner

ILLUMINATION MODULE WITH ANNULAR CIRCUIT BOARD AND MAGNETIC SUPPORTS

CROSS-REFERENCE TO RELATED APPLICATION

The application is a continuation application of the international application No. PCT/CN2021/140427, filed Dec. 22, 2021 and claims priority of the Chinese patent application No. 202023293942.3, filed Dec. 31, 2020, the entire disclosures of which are incorporated herein by reference for all purposes.

BACKGROUND

With the rapid development of lighting technology, ceiling lamps are more and more widely used in indoor lighting. The light source and a power supply driving component in existing lighting fixtures are often independent members, which need to be installed on the lighting fixture separately and then installed on the indoor ceiling. When the light source or the power supply driving component is damaged and needs to be replaced, the above components are not easy to be disassembled from the lighting fixture housing and mounted into the housing again.

SUMMARY

The disclosure relates to the technical field of lighting, and more specifically, to a lighting module, which has a simple structure and is convenient for assembling.

According to a first aspect of the present disclosure, an illumination module is provided, which includes: the light source, comprising an annular circuit board and a plurality of light sources arranged on the annular circuit board; a power supply driver, electrically connected with the annular circuit board; an optical component, having opposite front and back surfaces, the optical component comprising a power supply accommodating part and a lens part integrally connected to an around area of the power supply accommodating part, wherein a back surface of the power supply accommodating part is provided with a power supply groove, the front surface of the lens part is provided with a light distribution structure, and a circuit snap-fit member and a plurality of mounting part snap-fit members extend from the back surface of the lens part; a plurality of magnetic components, each of which comprises a base and a strong magnet, the base comprising a combining part and a snap-fit part connected with the combining part, and the strong magnet being connected with the combining part; wherein, the snap-fit part is in a snap-fit connection with the mounting part snap-fit member, the annular circuit board is arranged on the back surface of the lens part and is in a snap-fit connection with the circuit snap-fit member, the plurality of light sources are correspondingly arranged with the light distribution structure, and the power supply driver is accommodated in the power supply groove.

DETAILED DESCRIPTION

Figure 1:
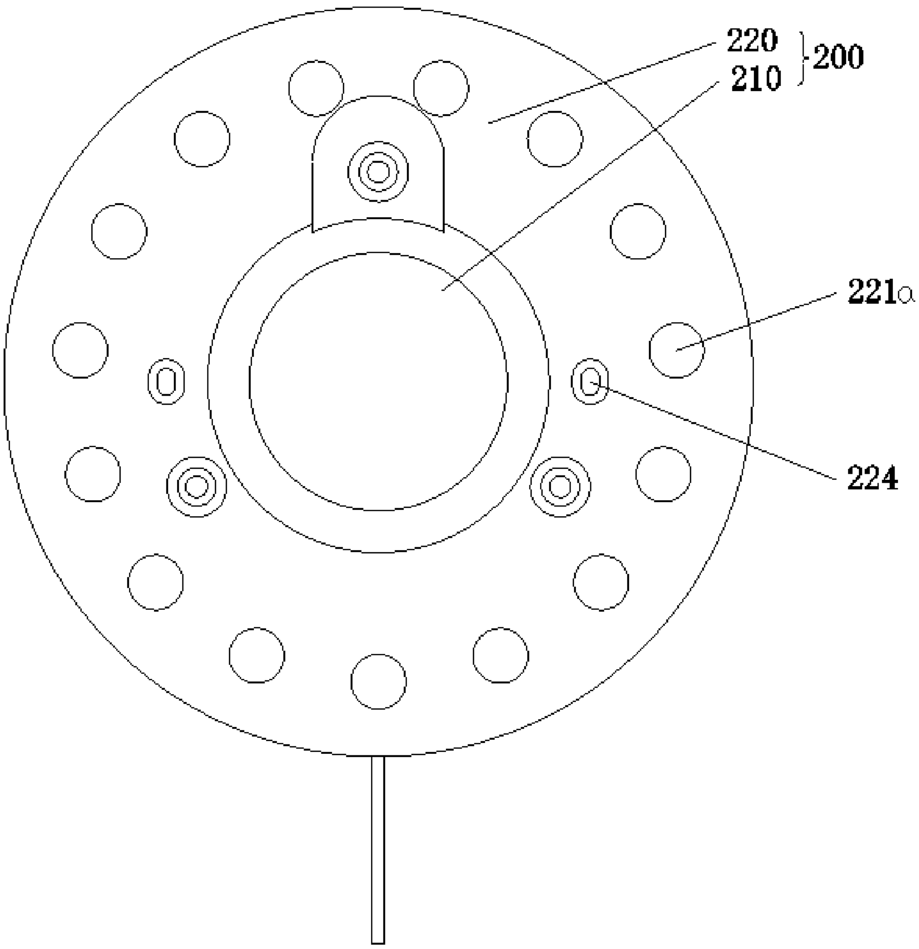
FIG. 1 is a front view of an illumination module according to an exemplary embodiment of the present disclosure.
Figure 2:
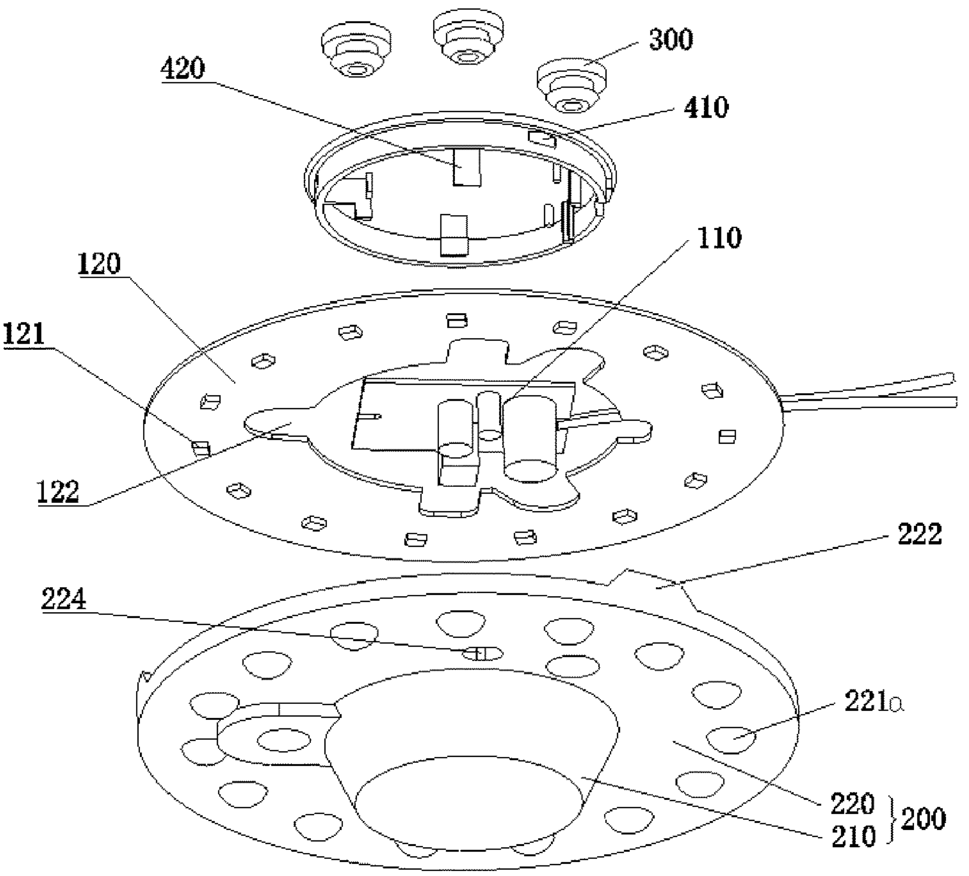
FIG. 2 is an exploded view (front) of an illumination module according to an exemplary embodiment of the present disclosure.
Figure 3:
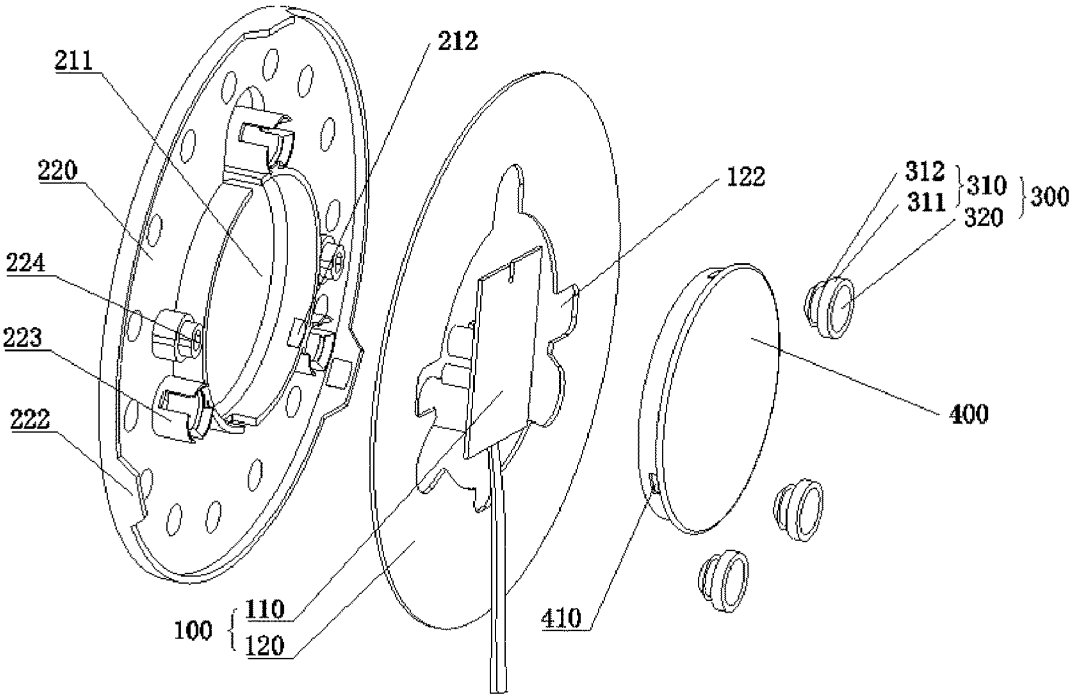
FIG. 3 is an exploded view (back) of an illumination module according to an exemplary embodiment of the present disclosure.

In the following, the specific embodiments of the present disclosure will be further described in detail with the drawings and embodiments. The following examples are used to illustrate the present disclosure, but are not used to limit the scope of the present disclosure.

The prior lighting module has a complex structure, troublesome assembly, and high manufacturing costs. In order to solve these problems, an integrated lighting module is provided. The light source and the power supply driver are integrated into one body to facilitate replacement.

Referring to FIGS. 1 to 6, an exemplary embodiment of the illumination module of the present disclosure is shown. The illumination module of the embodiment includes a light source 100, a power supply driver 110, an optical component 200, and a plurality of magnetic components 300.

The light source 100 includes an annular circuit board 120 and a plurality of light sources 121 disposed on the annular circuit board 120. The light source 121 is an LED light source, and a plurality of light sources 121 may all be white light source, warm yellow light source or partially white light source and partially warm yellow light source. The power supply driver 110 is electrically connected with the annular circuit board 120, and the power supply driver 110 is electrically connected with the annular circuit board 120 by an inserting connection wire, and the power supply driver 110 drives the light source 121 to emit light. The annular circuit board 120 is provided with a plurality of avoidance holes 122. The power supply driver 110 is connected with a reserved connecting wire for connecting with external commercial power, and when in use, it may be used by connecting the reserved connecting wire with the commercial power.

The optical component 200 has opposite front and back surfaces, and the optical component 200 includes a power supply accommodating part 210 and a lens part 220 integrally connected to an around area of the power supply accommodating part 210. The optical element 200 is made of transparent plastic and is formed by the integrally injection molding. The back surface of the power supply accommodating part 210 is provided with a power supply groove 211, the front surface of the lens part 220 is provided with a light distribution structure, and a circuit snap-fit member 222 and a plurality of mounting part snap-fit member 223 are extended from the back surface of the lens part 220.

The mounting part snap-fit member 223 includes a plurality of first elastic parts 2231 which extend outward from the back surface of the lens part 220 and enclose a snap-fit space 2233, and first snap-fit hooks 2232 extending from a side surface of the first elastic parts 2231 to the snap-fit space 2233.

The circuit snap-fit member 222 includes a plurality of second elastic parts 2221 extending outward from the edge of the back surface of the lens part 220 and second snap-fit hooks 2222 extending from a side surface of the second elastic parts 2221 and protruding towards the power supply accommodating part 210, that is, the second snap-fit hooks 2222 extend towards the middle of the optical element 200.

Each magnetic component 300 includes a base 310 and a strong magnet 320. The base 310 includes a combining part 311 and a snap-fit part 312 connected with the combining part 311, and the strong magnet 320 is connected with the combining part 311. The base 310 is made of plastic or metal by molding or stamping. In the embodiment, the base 310 is made of iron, the combining part 311 is provided with a combining hole 3111, and the strong magnet 320 is absorbed and assembled in the combining hole 3111.

Wherein, the snap-fit part 312 is in a snap-fit connection with the mounting part snap-fit member 223, the snap-fit part 312 is provided with an annular groove 3121, the snap-fit part 312 is inserted into the snap-fit space 2233, and the first snap-fit hook 2232 is clamped into the annular groove 3121 for snap-fit connection. The annular circuit board 120 is arranged on the back surface of the lens part 220 and is in a snap-fit connection with the circuit snap-fit member 222, and the annular circuit board 120 is clamped between the second snap-fit hooks 2222 and the lens part 220. The plurality of light sources 121 are arranged corresponding to the light distribution structure 221. In the embodiment, the light distribution structure comprises a plurality of light distribution particles 221*a* being in a one-to-one correspondence with the plurality of light sources 121. The power supply driver 110 is embedded in the power supply groove 211.

In the illumination module of the present disclosure, after the circuit board 120 and the magnetic component 300 are assembled on the optical component 200 in a snap-fit connection manner and the power supply driver 110 is arranged into the power supply groove 211, the assembly is completed. The structure is simple, the assembly is convenient, the assembly can be completed without using any screws, the assembly efficiency is improved, and the manufacturing cost is lower.

Further, the lens part 220 is provided with a nailing through hole 224. When there is no adsorbable material in the installation target of the illumination module, the magnetic component 300 cannot be installed, or the installation strength needs to be strengthened, the illumination module may be installed on the installation target through the nailing through hole 224 by using screws and nails, so that the illumination module in the present disclosure has a broader disclosure scene.

Further, the illumination module also includes a power supply cover plate 400, which is detachably connected with the power supply accommodating part 210 and covers the power supply groove 211, and the power supply cover plate 400 is provided to prevent the power supply driver 110 from being away from the power supply groove 211.

Figure 4:
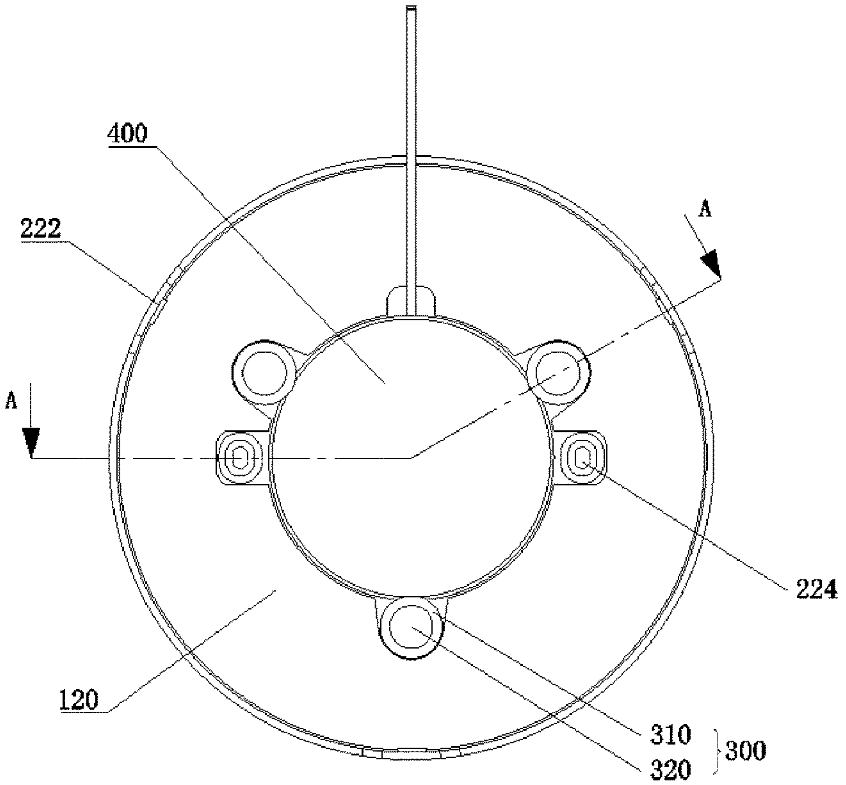
FIG. 4 is a rear view of an illumination module according to an exemplary embodiment of the present disclosure.
Figure 5:
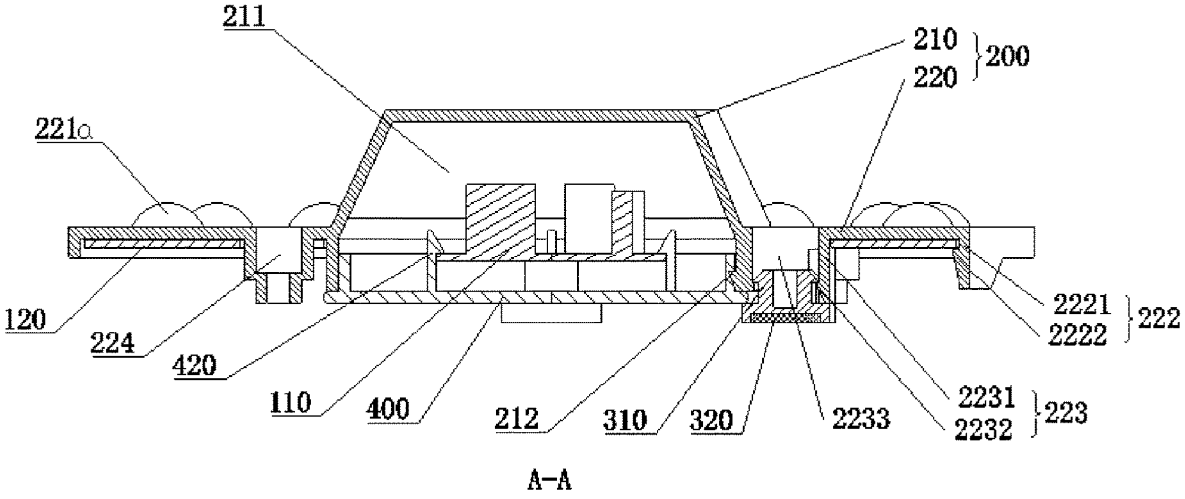
FIG. 5 is a cross-sectional view of FIG. 4 taken along A-A direction.
Figure 6:
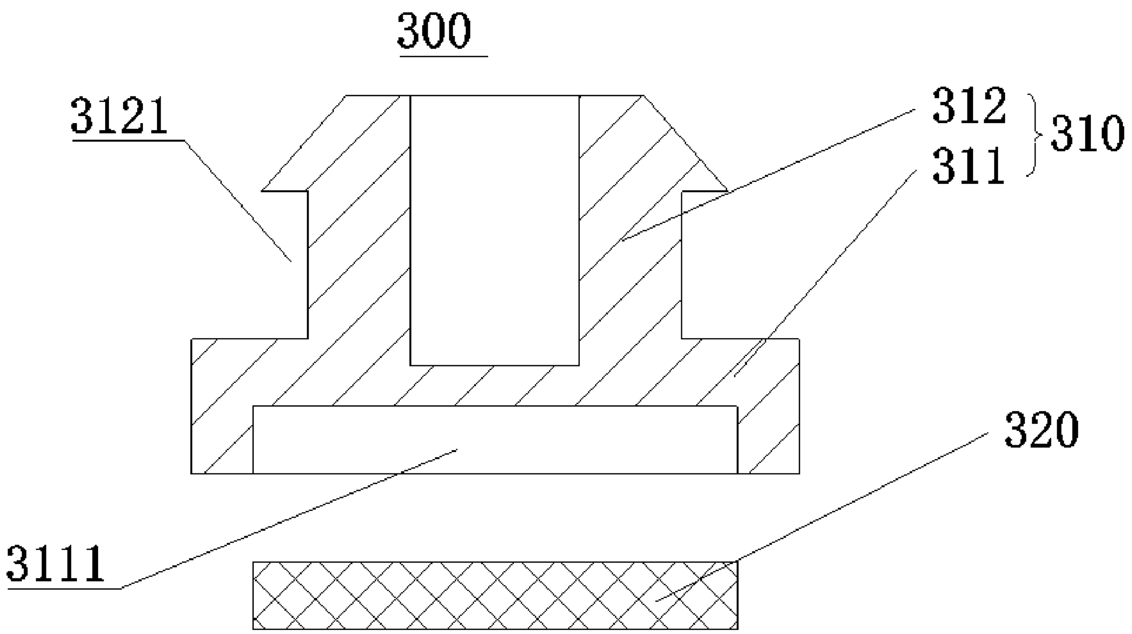
FIG. 6 is a cross-sectional view of a magnetic component of an illumination module according to an exemplary embodiment of the present disclosure.

Referring to FIG. 4, a plurality of mounting part snap-fit members 223 are arranged near the power supply accommodating part 210, the combining part 311 extends around the mounting part snap-fit member 223, and the combining part 311 abuts against the power supply cover plate 400 to fix the power supply cover plate 400.

Further, the power supply accommodating part 210 is provided with a third snap-fit hook 212, the power supply cover plate 400 is provided with a snap-fit hook hole 410, and the third snap-fit hook 212 is in a snap-fit connection with the snap-fit hook hole 410, so as to better prevent the power supply cover plate 400 from falling off.

As an exemplary way, a side of the power supply cover plate 400 facing the power groove 211 is provided with a power supply snap-fit member 420, and the power supply driver 110 is in a snap-fit connection with the power supply snap-fit member 420, so that the power supply driver 110 is fixed on the power supply cover plate 400, and the power supply driver 110 is prevented from being damaged by collision in the power supply groove 211.

Figure 7:
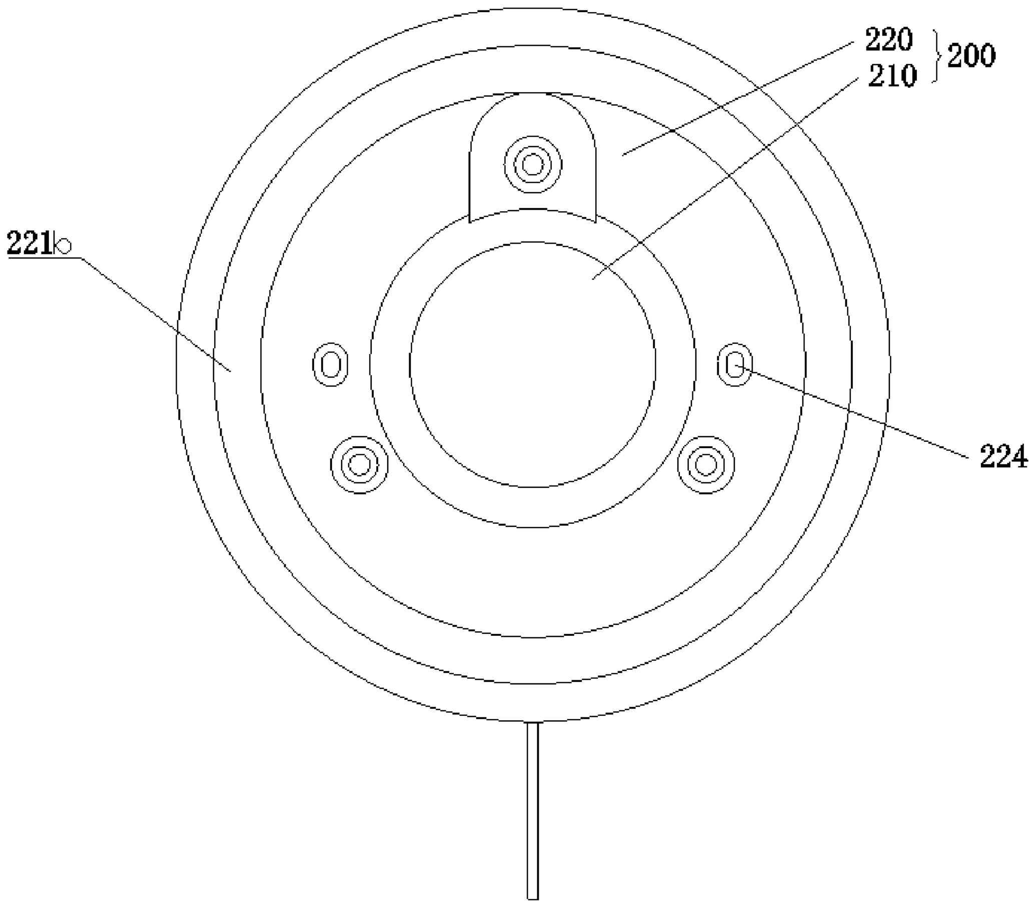
FIG. 7 is a front view of an illumination module according to another exemplary embodiment of the present disclosure.
Figure 8:
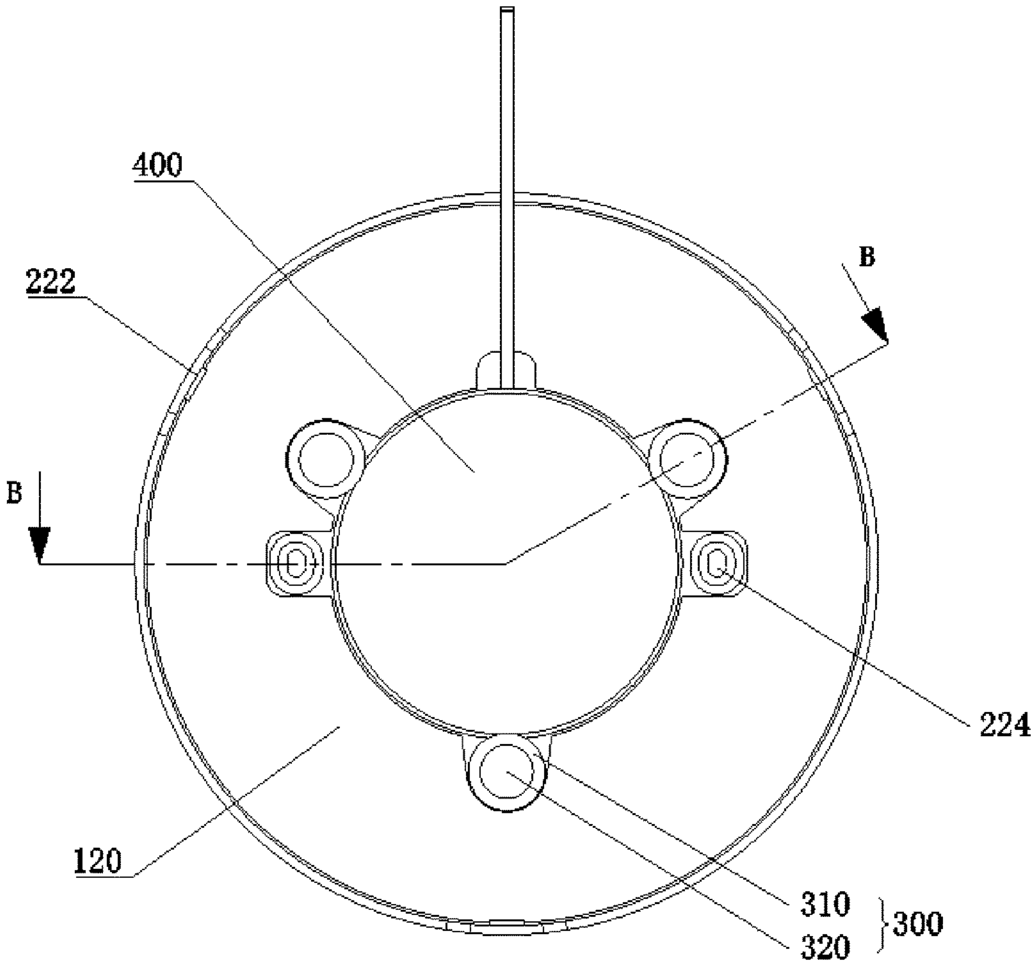
FIG. 8 is a rear view of an illumination module according to another exemplary embodiment of the present disclosure.
Figure 9:
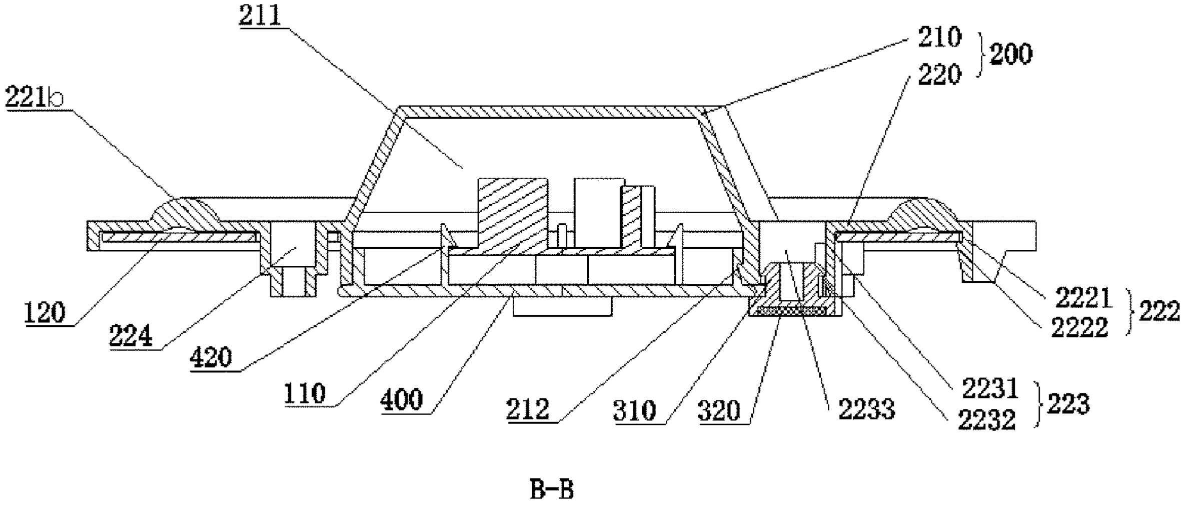
FIG. 9 is a cross-sectional view of FIG. 8 taken along B-B direction.

Referring to FIGS. 7 to 9, another exemplary embodiment of an illumination module of the present disclosure is shown. This embodiment is basically the same as the previous embodiment, except that the light distribution structure in the embodiment is a light distribution convex ring 221*b*.

In some embodiments, the optical component is integrally injection molded.

In some embodiments, the light distribution structure is a plurality of light distribution protrusions corresponding to the light sources in a one-to-one correspondence relationship.

In some embodiments, the light distribution structure is a light distribution convex ring.

In some embodiments, the mounting part snap-fit member comprises a plurality of first elastic parts extending outwards from the back surface of the lens part and enclosing a snap-fit space, and a first snap-fit hook extending from a side surface of the plurality of first elastic parts to the snap-fit space; the snap-fit part of the magnetic component is provided with an annular groove, the snap-fit part is inserted into the snap-fit space, and the first snap-fit hook is in a snap-fit connection with the annular groove.

In some embodiments, the lens part is provided with a nailing through hole.

In some embodiments, the circuit snap-fit member comprises a plurality of second elastic parts extending outwards from the edge of the back surface of the lens part and a plurality of second snap-fit hooks extending outwards from the side surface of the second elastic parts towards the power supply accommodating part; the annular circuit board is clamped between the second snap-fit hook and the lens part.

In some embodiments, the power supply cover plate is also included, and the power supply cover plate is detachably connected with the power supply accommodating part and covers the power supply groove.

In some embodiments, the power supply accommodating part is provided with a third snap-fit hook, the power supply cover plate is provided with a snap-fit hook hole, and the third snap-fit hook is in a snap-fit connection with the snap-fit hook hole.

In some embodiments, a side of the power supply cover plate facing the power supply groove is provided with a power supply snap-fit member, and the power supply driver is in a snap-fit connection with the power supply snap-fit member.

In some embodiments, the plurality of mounting part snap-fit members is arranged at positions close to the power supply accommodating part, the combining part extend out of the periphery of the mounting part snap-fit member, and the combining part abuts against the power supply cover plate.

Compared with the prior art, the disclosure has the following advantages:

The illumination module provided by the present disclosure is simple in structure and convenient to assemble, and can be assembled without using any screws, so that the assembly efficiency is improved and the manufacturing cost is lower.

It should be noted that the embodiment of the present disclosure has better exemplary embodiment, and does not limit the present disclosure in any form. Any skilled person familiar with the field may change or modify the technical content disclosed above into an equivalent effective embodiment, but which does not separate from the content of the technical solution of the present disclosure, any amendment or equivalent change and modification of the above embodiment which is made according to the technical essence of this disclosure still falls within the scope of the technical solution of the disclosure.

What is claimed is:

1. An illumination module, comprising:

a light source, comprising an annular circuit board and a plurality of light sources arranged on the annular circuit board;

a power supply driver, electrically connected with the annular circuit board;

an optical component, having a front surface and a back surface opposite to the back surface, the optical component comprising a power supply accommodating part and a lens part integrally connected to an around area of the power supply accommodating part, a back surface of the power supply accommodating part comprising a power supply groove, a front surface of the lens part comprising a light distribution structure, and a circuit snap-fit member and a plurality of mounting part snap-fit members extending from a back surface of the lens part;

a plurality of magnetic components, each of the plurality of magnetic components comprising a base and a strong magnet, the base comprising a combining part and a snap-fit part connected with the combining part, and the strong magnet being connected with the combining part;

wherein the snap-fit part is in a snap-fit connection with the mounting part snap-fit member, the annular circuit board is arranged on the back surface of the lens part and in a snap-fit connection with the circuit snap-fit member, the plurality of light sources is correspondingly arranged with the light distribution structure, and the power supply driver is accommodated in the power supply groove.

2. The illumination module according to claim 1, wherein the optical component is integrally injection molded.

3. The illumination module according to claim 1, wherein the light distribution structure comprises a plurality of light distribution protrusions corresponding to the plurality of light sources in a one-to-one correspondence relationship.

4. The illumination module according to claim 1, wherein the light distribution structure comprises a light distribution convex ring.

5. The illumination module according to claim 1, wherein the mounting part snap-fit member comprises a plurality of first elastic parts extending outwards from the back surface of the lens part and enclosing a snap-fit space, and a plurality of first snap-fit hooks extending from a side surface of the plurality of first elastic parts towards the snap-fit space; the snap-fit part of the magnetic component comprises an annular groove, the snap-fit part is inserted into the snap-fit space, and the first snap-fit hook is clamped into the annular groove.

6. The illumination module according to claim 1, wherein the lens part comprises a nailing through hole.

7. The illumination module according to claim 1, wherein the circuit snap-fit member comprises a plurality of second elastic parts extending outward from an edge of the back surface of the lens part, and a plurality of second snap-fit hooks extending from a side surface of the second elastic part towards the power supply accommodating part; the annular circuit board is clamped between the second snap-fit hook and the lens part.

8. The illumination module according to claim 1, further comprising a power supply cover plate, wherein the power supply cover plate is detachably connected with the power supply accommodating part and covers the power supply groove.

9. The illumination module according to claim 8, wherein the power supply accommodating part comprises a third snap-fit hook, the power supply cover plate comprises a snap-fit hook hole, and the third snap-fit hook is in a snap-fit connection with the snap-fit hook hole.

10. The illumination module according to claim 8, wherein the power supply cover plate comprises a power supply snap-fit member on a side facing the power supply groove of the power supply cover plate, and the power supply driver is in a snap-fit connection with the power supply snap-fit member.

11. The illumination module according to claim 8, wherein the plurality of the mounting part snap-fit members is arranged at positions close to the power supply accommodating part, the combining part extends around the mounting part snap-fit member, and the combining part abuts against the power supply cover plate.

12. A lamp, comprising:

an illumination module, comprising:

a light source, comprising an annular circuit board and a plurality of light sources arranged on the annular circuit board;

a power supply driver, electrically connected with the annular circuit board;

an optical component, having a front surface and a back surface opposite to the back surface, and comprising a power supply accommodating part and a lens part integrally connected to an around area of the power supply accommodating part, a back surface of the power supply accommodating part comprising a power supply groove, a front surface of the lens part comprising a light distribution structure, and a circuit snap-fit member and a plurality of mounting part snap-fit members extending from a back surface of the lens part;

a plurality of magnetic components, each of the plurality of magnetic components comprising a base and a strong magnet, the base comprising a combining part and a snap-fit part connected with the combining part, and the strong magnet being connected with the combining part;

wherein the snap-fit part is in a snap-fit connection with the mounting part snap-fit member, the annular circuit board is arranged on the back surface of the lens part and in a snap-fit connection with the circuit snap-fit member, the plurality of light sources is correspondingly arranged with the light distribution structure, and the power supply driver is accommodated in the power supply groove.

13. The lamp according to claim 12, wherein the optical component is integrally injection molded.

14. The lamp according to claim 12, wherein the light distribution structure comprises a plurality of light distribution protrusions corresponding to the plurality of light sources in a one-to-one correspondence relationship.

15. The lamp according to claim 12, wherein the light distribution structure comprises a light distribution convex ring.

16. The lamp according to claim 12, wherein the mounting part snap-fit member comprises a plurality of first elastic parts extending outwards from the back surface of the lens part and enclosing a snap-fit space, and a plurality of first snap-fit hooks extending from a side surface of the plurality of first elastic parts towards the snap-fit space; the snap-fit part of the magnetic component comprises an annular groove, the snap-fit part is inserted into the snap-fit space, and the first snap-fit hook is clamped into the annular groove.

17. The lamp according to claim 12, wherein the lens part comprises a nailing through hole.

18. The lamp according to claim 12, wherein the circuit snap-fit member comprises a plurality of second elastic parts extending outward from an edge of the back surface of the lens part, and a plurality of second snap-fit hooks extending from a side surface of the second elastic part towards the power supply accommodating part; the annular circuit board is clamped between the second snap-fit hook and the lens part.

19. The lamp according to claim 12, wherein the illumination module further comprises a power supply cover plate, wherein the power supply cover plate is detachably connected with the power supply accommodating part and covers the power supply groove.

20. The lamp according to claim 19, wherein the power supply accommodating part comprises a third snap-fit hook, the power supply cover plate comprises a snap-fit hook hole, and the third snap-fit hook is in a snap-fit connection with the snap-fit hook hole.

* * * * *